United States Patent [19]
Saito et al.

[11] Patent Number: 5,149,178
[45] Date of Patent: Sep. 22, 1992

[54] HYDRAULIC BRAKING SYSTEM FOR AN AUTOMOTIVE VEHICLE

[75] Inventors: Tadao Saito, Nagoya; Masakazu Sugisawa, Takahama; Yoshio Watanabe, Kariya, all of Japan

[73] Assignee: Aisin Seiki K.K., Kariya, Japan

[21] Appl. No.: 676,483

[22] Filed: Mar. 28, 1991

[30] Foreign Application Priority Data

Mar. 31, 1990 [JP] Japan ............................ 2-34308[U]

[51] Int. Cl.$^5$ ............................................... B60T 8/34
[52] U.S. Cl. .............................. 303/116 R; 303/84.1; 303/87
[58] Field of Search ........ 303/113 R, 116 R, 119 SV, 303/DIG. 5, DIG. 6, 84.1, 84.2, 87; 188/181 R, 181 A; 137/513.3, 513.5, 513.7

[56] References Cited

U.S. PATENT DOCUMENTS

| | | | |
|---|---|---|---|
| 4,453,782 | 6/1984 | Arikawa et al. | 303/116 |
| 4,485,904 | 12/1984 | Udono et al. | 137/513.7 X |
| 4,668,024 | 5/1987 | Nakanishi et al. | 303/119 |
| 4,703,979 | 10/1987 | Nakanishi et al. | 303/116 R |
| 4,772,075 | 9/1988 | Wupper et al. | 303/DIG. 5 X |
| 4,784,444 | 11/1988 | McCann et al. | 137/513.5 X |
| 4,936,637 | 1/1990 | Adachi et al. | 303/116 |
| 4,941,712 | 7/1990 | Hirobe | 303/119 R X |
| 5,002,345 | 3/1991 | Becker | 303/DIG. 5 X |
| 5,020,864 | 6/1991 | Tanaka | 303/84.1 |
| 5,031,964 | 7/1991 | Siegel | 303/87 X |

FOREIGN PATENT DOCUMENTS

| | | |
|---|---|---|
| 0181643 | 5/1986 | European Pat. Off. . |
| 3147149 | 11/1981 | Fed. Rep. of Germany . |
| 61-282158 | 12/1986 | Japan . |
| 2187521 | 9/1987 | United Kingdom . |
| 2213222 | 8/1989 | United Kingdom . |
| 2214250 | 8/1989 | United Kingdom . |
| 2218480 | 11/1989 | United Kingdom . |
| 2219055 | 11/1989 | United Kingdom . |
| 2223813 | 4/1990 | United Kingdom . |
| 2235507 | 3/1991 | United Kingdom . |

*Primary Examiner*—Robert J. Oberleitner
*Assistant Examiner*—Lee W. Young
*Attorney, Agent, or Firm*—Sughrue, Mion, Zinn, Macpeak & Seas

[57] ABSTRACT

A hydraulic braking system for an automotive vehicle having a master cylinder communicated with a wheel brake cylinder through a primary passage, and an antiskid apparatus including a fluid pump which is disposed in a recirculation passage connected to the primary passage. An orifice is disposed in the recirculation passage on a discharge side of said fluid pump. In parallel with the orifice, a relief valve is disposed. The relief valve permits a flow of a brake fluid from the fluid pump to the primary passage when a differential pressure between the pressures on the upstream side and downstream side of the orifice exceeds a predetermined value. Consequently, a discharge pulsation of the fluid pump is effectively reduced.

6 Claims, 1 Drawing Sheet

HYDRAULIC BRAKING SYSTEM FOR AN AUTOMOTIVE VEHICLE

BACKGROUND OF THE INVENTION

1. Field of the Invention

The present invention relates to a hydraulic braking system for use in an automotive vehicle, and more particularly to a hydraulic braking system having a recirculation type anti-skid apparatus.

2. Description of the Prior Art

As one of the hydraulic braking systems for automotive vehicles, Japanese Patent Laid-open Publication No. 61-282158, for example, discloses a system in which a recirculation type anti-skid apparatus including a fluid pump is disposed in a hydraulic circuit connecting a hydraulic pressure chamber of a master cylinder to a wheel brake cylinder.

In the above-described conventional system, a discharge passage of the fluid pump is connected to the hydraulic circuit between the hydraulic pressure chamber of the master cylinder and the wheel brake cylinder, and a brake fluid discharged from the fluid pump is recirculated to the hydraulic circuit. Therefore, in the anti-skid operation, a so-called kick-back phenomenon occurs and causes uncomfortable vibrations to a brake pedal with a discharge pulsation of the fluid pump transmitted to the master cylinder through the hydraulic circuit, and then to the brake pedal. Also, the vibrations or the like due to the discharge pulsation of the fluid pump cause a noise in a vehicle compartment.

The above problems may be dissolved by smoothening the discharge pulsation through an orifice which is disposed in the discharge passage of the fluid pump connected to the hydraulic circuit. For this purpose, the orifice must have a desired small-diameter. With such desired small-diameter orifice, however, a pressure load to the fluid pump is increased under a low temperature condition where the viscosity of brake fluid is high, so that durabilities of the fluid pump and a driving device for driving the fluid pump such as an electric motor are deteriorated. Further, the orifice is highly liable to be choked with a foreign matter. Therefore, if the orifice is choked with the foreign matter, the pressure load to the fluid pump is increased, so that the durability of the fluid pump or the like might be deteriorated.

SUMMARY OF THE INVENTION

Accordingly, it is an object of the present invention to provide a hydraulic braking system having a recirculation type anti-skid apparatus, which effectively reduces a discharge pulsation of a fluid pump without deteriorating a durability of the fluid pump or the like.

In accomplishing this and other objects, a hydraulic braking system for an automotive vehicle according to the present invention is provided with a master cylinder communicated with a wheel brake cylinder for supplying a brake fluid thereto through a primary passage, and an anti-skid apparatus which includes a fluid pump disposed in a recirculation passage connected to the primary passage. The hydraulic braking system includes an orifice which is disposed in the recirculation passage on the discharge side of the fluid pump, and a relief valve which is disposed in the recirculation passage in parallel with the orifice. The relief valve is arranged to block a flow of the brake fluid from the primary passage to the fluid pump and permit a flow of the brake fluid from the fluid pump to the primary passage when a differential pressure between the pressure on the upstream side of the orifice and the pressure on the downstream side thereof exceeds a predetermined value.

The above-described hydraulic braking system preferably includes a damper which is disposed in the recirculation passage at a position thereof between the fluid pump and the orifice.

In the above-described hydraulic braking system, the orifice may be incorporated into the relief valve.

BRIEF DESCRIPTION OF THE DRAWINGS

The above stated object and following description will become readily apparent with reference to the accompanying drawings, wherein like reference numerals denote like elements, and in which.

DESCRIPTION OF THE PREFERRED EMBODIMENTS

Figure 1:
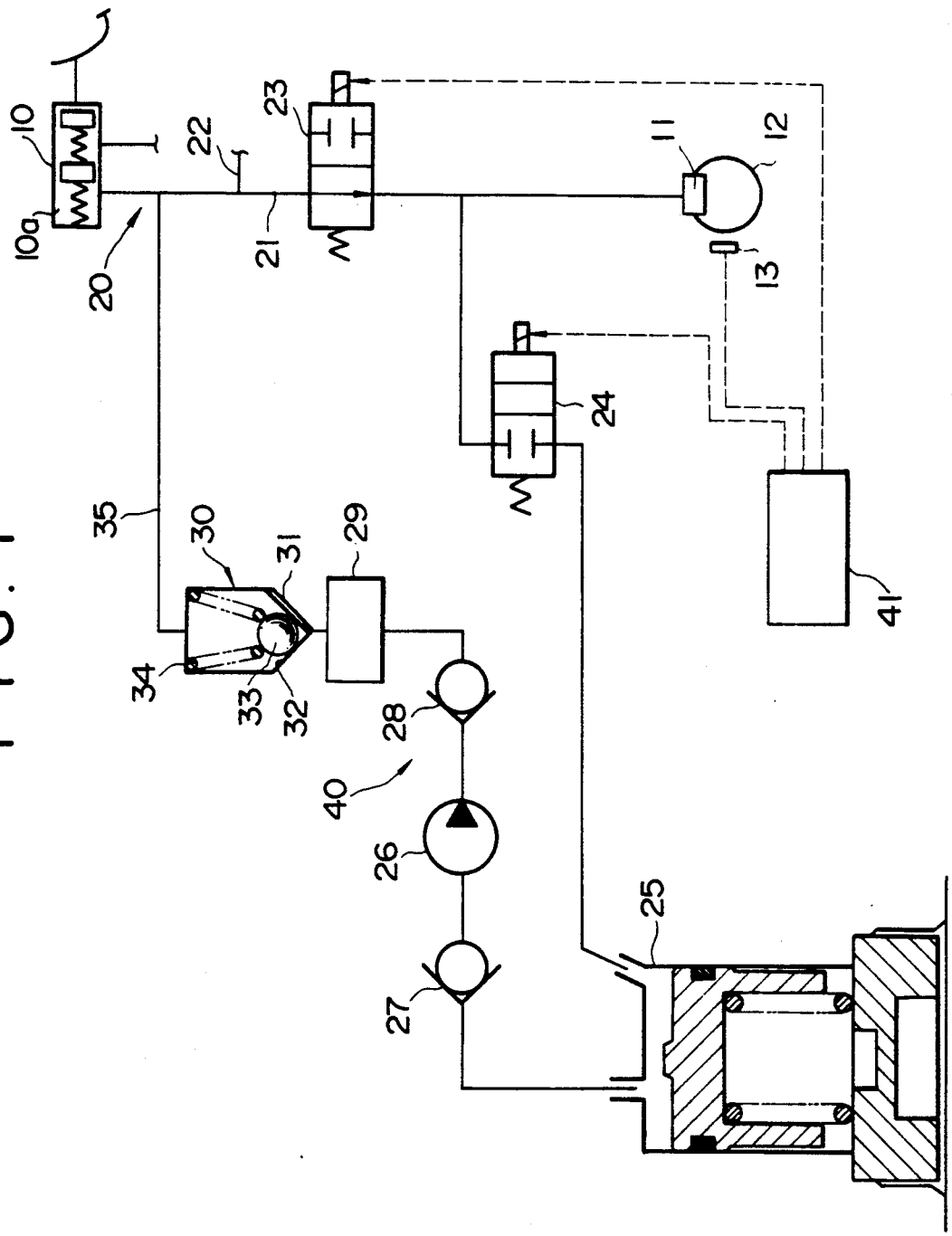
FIG. 1 is a schematic illustration of a hydraulic braking system of an embodiment of the present invention.

Referring to FIG. 1, there is illustrated a hydraulic braking system of an embodiment of the present invention, in which a front hydraulic pressure chamber 10a of a tandem master cylinder 10 is connected to a wheel brake cylinder 11 and another wheel brake cylinder (not shown) through a hydraulic circuit 20, and a recirculation type anti-skid circuit 40 is connected to the hydraulic circuit 20. The hydraulic circuit 20 includes a passage 21 which connects the front hydraulic pressure chamber 10a of the master cylinder 10 to the wheel brake cylinder 11 and which corresponds to a primary passage according to the present invention, and includes a passage 22 branching off from the passage 21 and connected to other wheel brake cylinders (not shown).

The recirculation type anti-skid apparatus 40 includes a supply control valve 23 disposed in the passage 21, a discharge control valve 24 connected thereto, a reservoir 25 disposed in parallel with the supply control valve 23, a check valve 27, a fluid pump 26, a check valve 28, and a damper 29 which damps the discharge pulsation of the fluid pump 26 by a predetermined amount. Each of the supply control valve 23 and the discharge control valve 24 is a changeover valve of a two ports-two positions solenoid operated valve, and is controlled to be repeatedly changed over by an electric control unit 41 in a known way, so as to maintain a slip rate within an appropriate range. The slip rate is calculated in the electric control unit 41 on the basis of an output signal of a rotation sensor 13 which detects a rotational speed of a wheel 12. The supply control valve 23 permits the communication between the wheel brake cylinder 11 and the front hydraulic pressure chamber 10a of the master cylinder 10 as shown in FIG. 1 when the supply control valve 23 is deenergized, while it blocks the communication therebetween when energized. The discharge control valve 24 blocks the communication between the wheel brake cylinder 11 and the reservoir 25 as shown in FIG. 1 when the discharge control valve 24 is deenergized, while it permits the communication therebetween when energized.

The fluid pump 26 is controlled by the electric control unit 41 to be driven by an electric motor (not shown) in the anti-skid operation, particularly, slightly later than the first energization of the supply control valve 23 and the discharge control valve 24. In pumping operation, the fluid pump 26 sucks up a brake fluid, which is discharged from the wheel brake cylinder 11 via the discharge control valve 24 and stored in the reservoir 25, through the check valve 27. Then, the fluid pump 26 returns the brake fluid to the passage 21 connecting the front hydraulic pressure chamber 10a of the master cylinder 10 to the wheel brake cylinder 11, through the check valve 28, the damper 29 and a slit 31 which will be described later. The recirculation type anti-skid apparatus 40 is arranged such that the brake fluid discharged from the wheel brake cylinder 11 to the reservoir 25 as noted above is sucked up by the fluid pump 26 and then returned to the passage 21 between the hydraulic pressure chamber 10a of the master cylinder 10 and the wheel brake cylinder 11 through a discharge passage 35 which constitutes a recirculation passage according to the present invention.

In the present embodiment, a relief valve 30 is disposed in the discharge passage 35 between the damper 29 and the passage 21 connecting the front hydraulic pressure chamber 10a of the master cylinder 10 and the wheel brake cylinder 11. The relief valve 30 is arranged to be opened with a predetermined pressure applied thereto for permitting a flow of the brake fluid from the damper 29 to the passage 21, while blocking a flow of the brake fluid from the passage 21 to the damper 29. The relief valve 30 is provided in a housing threof with a valve seat 32 to which the discharge passage leading from the damper 29 opens, and a ball-like valve member 33 which is normally biased by means of a spring 34 under a predetermined force to be seated on the valve seat 32. The valve seat 32 is formed on a surface thereof with a slit 31 which provides a desired small-diameter orifice for satisfactorily smoothening the discharge pulsation of the fluid pump 26, particularly, the discharge pulsation damped by the damper 29 in the present embodiment.

In the above embodiment, in ordinary braking operation, a pressurized brake fluid is supplied from the front hydraulic pressure chamber 10a of the master cylinder 10 to the wheel brake cylinder 11 through the supply control valve 23 in its deenergized condition, so that the wheel 12 is braked. In this case, the check valve 28 prevents the pressurized brake fluid from being discharged to the reservoir 25.

Accordingly, in the anti-skid operation, the supply control valve 23 and the discharge control valve 24 are repeatedly changed over, and the fluid pump 26 is driven, so that the brake fluid discharged to the reservoir 25 is sucked up by the fluid pump 26 and then returned to the passage 21 through the damper 29 and the slit 31. In this operation, since the discharge pulsation of the fluid pump 26 is satisfactorily smoothened by the damper 29 and the slit 31, the kick-back, which is supposed to cause uncomfortable vibrations to the brake pedal with the discharge pulsation transmitted to the front hydraulic pressure chamber 10a of the master cylinder 10 through the passage 21, does not occur, nor occurs the vibrations or the like due to the discharge pulsation of the fluid pump 26 to cause a noise in a vehicle compartment.

Further, in the anti-skid operation, in the low temperature condition where the viscosity of the brake fluid is high, the pressure load to the fluid pump 26 is increased due to the high viscosity of the brake fluid. In this case, however, the relief valve 30 is opened when a differential pressure between the pressures on the upstream side and downstream side of the slit 31 exceeds the pressure for enabling the relief valve 30 to be opened, so that the brake fluid discharged from the fluid pump 26 is returned to the passage 21. Consequently, the increase of the pressure load to the fluid pump 26 is prevented.

Even in the case where the slit 31 is choked with a foreign matter or the like to increase the pressure load to the fluid pump 26, the relief valve 30 is opened similarly when the differential pressure between the pressures on the upstream side and downstream side of the slit 31 becomes higher than the predetermined pressure, so that the brake fluid discharged from the fluid pump 26 is returned to the passage 21. Consequently, the increase of the pressure load to the fluid pump 26 is prevented, and simultaneously the foreign matter is removed with the relief valve 30 opened. When the foreign matter is removed, the orifice is formed again by the slit 31.

Thus, according to the present embodiment, the discharge pulsation is satisfactorily smoothened by the desired small-diameter orifice while ensuring high reliability against the choking with the foreign matter, and without deteriorating the durability of the fluid pump or the like.

Figure 2:
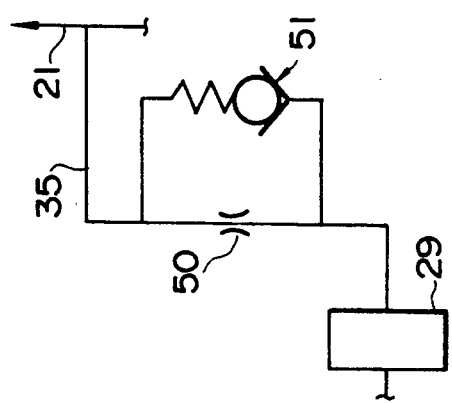
FIG. 2 is a schematic view showing a part of another embodiment of the present invention.

FIG. 2 shows another embodiment of the present invention. In this embodiment, a desired small-diameter orifice 50 for satisfactorily smoothening the discharge pulsation of the fluid pump is disposed in the discharge passage 35 extending from the damper 29 to the passage 21, and a relief valve 51 is disposed in parallel with the orifice 50. The relief valve 51 is arranged to be opened with a predetermined pressure applied thereto for permitting a flow of the brake fluid from the damper 29 to the passage 21 while blocking the flow of the brake fluid from the passage 21 to the damper 29.

In this embodiment, the discharge pulsation is satisfactorily smoothened by the orifice 50 in the ordinary anti-skid operation, and the relief valve 51 prevents the increase of the pressure load to the fluid pump 26 at a low temperature, and prevents the increase of the pressure load in the case where the orifice 50 is choked with the foreign master or the like.

In the above embodiments, the present invention has been embodied in a system, in which the hydraulic pressure of the wheel brake cylinder 11 is reduced, held and increased by the supply control valve 23 and the discharge control valve 24. However, the present invention may be embodied in a system, in which the hydraulic pressure of the wheel brake cylinder 11 is reduced, held and increased by a supply-discharge changeover valve using a three ports-two positions solenoid operated valve, or a three ports-three positions solenoid operated valve or the like. Further, while the reservoir 25 in the above embodiments has a closed type structure as shown in FIG. 1, an atmospheric open type reservoir may be used.

It should be apparent to one skilled in the art that the above-described embodiments are merely illustrative of but a few of the many possible specific embodiments of the present invention. Numerous and various other arrangements can be readily devised by those skilled in the art without departing from the spirit and scope of the invention as defined in the following claims.

We claim:

1. A hydraulic braking system for an automotive vehicle having a master cylinder communicated with a wheel brake cylinder for supplying a brake fluid thereto through a primary passage, and an anti-skid apparatus including a fluid pump disposed in a recirculation passage connected to said primary passage, comprising:

an orifice disposed in said recirculation passage on the discharge side of said fluid pump and directly communicated with said master cylinder; and a relief valve disposed in said recirculation passage in parallel with said orifice, said relief valve blocking a flow of the brake fluid from said primary passage to said fluid pump and permitting a flow of the brake fluid from said fluid pump to said primary passage when a differential pressure between the pressure on the upstream side of said orifice and the pressure on the downstream side thereof exceeds a predetermined value.

2. A hydraulic braking system for an automotive vehicle as set forth in claim 1, wherein said orifice is incorporated into said relief valve.

3. A hydraulic braking system for an automotive vehicle as set forth in claim 2, wherein said relief valve comprises a housing, a valve seat formed in said housing, and a valve member accommodated in said housing and biased to be seated on said valve seat, and wherein said valve seat is formed on a surface thereof a slit extending from the upstream side of said valve member to the downstream side thereof to form said orifice when said valve member is seated on said valve seat.

4. A hydraulic braking system for an automotive vehicle as set forth in claim 3, further comprising a damper disposed in said recirculation passage at a position thereof between said fluid pump and said relief valve.

5. A hydraulic braking system for an automotive vehicle as set forth in claim 1, further comprising a damper disposed in said recirculation passage at a position thereof between said fluid pump and said orifice.

6. A hydraulic braking system for an automotive vehicle having a master cylinder communicated with a wheel brake cylinder for supplying a brake fluid thereto through a primary passage, and an anti-skid apparatus including a fluid pump disposed in a recirculation passage connected to said primary passage, including:

valve means disposed in said recirculation passage at a position thereof between said fluid pump and said primary passage, and directly communicated with said master cylinder, said valve means comprising a housing, a valve seat formed in said housing, a valve member accommodated in said housing, and a spring accommodated in said housing for biasing said valve member to be seated on said valve seat, said valve seat being formed on a surface thereof with a slit extending from said fluid pump side of said valve member to said primary passage side thereof, and said valve member being unseated from said valve seat when the pressure on said fluid pump side of said slit exceeds the pressure on said primary passage side thereof by at least a predetermined value.

* * * * *